US011260892B2

(12) United States Patent
Kiesler et al.

(10) Patent No.: US 11,260,892 B2
(45) Date of Patent: Mar. 1, 2022

(54) PUSHCHAIR CHASSIS AND PUSHCHAIR

(71) Applicant: CYBEX GmbH, Bayreuth (DE)

(72) Inventors: Franz Kiesler, Bayreuth (DE); Ralf Holleis, Bayreuth (DE); Johannes Hauser, Bayreuth (DE); Jason Barker, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 318 days.

(21) Appl. No.: 16/333,092

(22) PCT Filed: Sep. 14, 2017

(86) PCT No.: PCT/EP2017/073091
§ 371 (c)(1),
(2) Date: Mar. 13, 2019

(87) PCT Pub. No.: WO2018/050728
PCT Pub. Date: Mar. 22, 2018

(65) Prior Publication Data
US 2019/0270474 A1  Sep. 5, 2019

(30) Foreign Application Priority Data

Sep. 15, 2016 (DE) .................... 20 2016 105 140.1
Feb. 14, 2017 (DE) .................... 20 2017 100 792.8

(51) Int. Cl.
*B62B 7/08* (2006.01)
*B62B 7/06* (2006.01)
*B62B 5/06* (2006.01)

(52) U.S. Cl.
CPC ............... *B62B 7/062* (2013.01); *B62B 7/06* (2013.01); *B62B 7/08* (2013.01); *B62B 5/064* (2013.01);

(Continued)

(58) Field of Classification Search
CPC .................................... B62B 7/06; B62B 7/08
See application file for complete search history.

(56) References Cited

U.S. PATENT DOCUMENTS 6,116,624 A * 9/2000 Hu ........................... B62B 9/203
  280/47.36
6,422,586 B1   7/2002 Glover
(Continued)

FOREIGN PATENT DOCUMENTS

CN   2690255 Y   4/2005
CN   101204966 A   6/2008
(Continued)

OTHER PUBLICATIONS

"Russian Patent Application No. 2019110879.2, Decision dated Feb. 26, 2021", (w/ English Translation), 22 pgs.
(Continued)

*Primary Examiner* — James A Shriver, II
*Assistant Examiner* — James J Triggs
(74) *Attorney, Agent, or Firm* — Schwegman Lundberg & Woessner, P.A.

(57) ABSTRACT

A foldable pushchair chassis, particularly a sport-model pushchair chassis, buggy chassis or similar vehicle chassis for children, comprising wheels and a push element for pushing the pushchair chassis, wherein said pushchair chassis can be brought at least into a lockable usage state and into a folded, lockable storage state, and a, particularly manual, actuation device is provided and configured such that during transfer from the locked usage state into the locked storage state, at least two locking procedures can occur, in particular both release of the locking in the usage state and adjustment of locking in the storage state, by means of a single first actuation of said actuation device.

13 Claims, 8 Drawing Sheets

(52) U.S. Cl.
CPC ....... *B62B 2205/22* (2013.01); *B62B 2205/24* (2013.01)

(56) References Cited

U.S. PATENT DOCUMENTS

| | | | |
|---|---|---|---|
| 7,267,359 B1 * | 9/2007 | Yang | B62B 7/08 280/47.34 |
| 8,419,121 B2 * | 4/2013 | Hu | A47D 1/023 297/16.1 |
| 8,876,147 B2 * | 11/2014 | Chicca | B62B 7/062 280/642 |
| 9,135,205 B1 * | 9/2015 | Ryan | G06F 3/0626 |
| 9,193,373 B2 * | 11/2015 | Fjelland | B62B 7/10 |
| 9,517,788 B2 * | 12/2016 | He | B62B 7/086 |
| 9,725,106 B2 | 8/2017 | Pos | |
| 10,137,922 B2 * | 11/2018 | Yuan | B62B 9/26 |
| 2005/0098981 A1 | 5/2005 | Chang | |
| 2008/0079240 A1 | 4/2008 | Yeh | |
| 2009/0020984 A1 | 1/2009 | Chen et al. | |
| 2010/0308550 A1 | 12/2010 | Li et al. | |
| 2013/0113185 A1 | 5/2013 | Zehfuss | |
| 2015/0360709 A1 | 12/2015 | Pos | |

FOREIGN PATENT DOCUMENTS

| | | |
|---|---|---|
| CN | 102069831 A | 5/2011 |
| DE | 202005008369 | 10/2005 |
| DE | 202007011019 | 12/2007 |
| DE | 102014110215 A1 | 12/2015 |
| GB | 2330116 A | 4/1999 |
| RU | 2163205 C1 | 2/2001 |
| WO | WO-2018050728 A2 | 3/2018 |

OTHER PUBLICATIONS

"International Application PCT/EP2017/073091, English Translation of International Preliminary Report on Patentability dated Mar. 19, 2019", (dated Mar. 19, 2019), 11 pgs.

"International Application No. PCT/EP2017/073091, International Search Report and Wrtiten Opinion dated Apr. 3, 2018", (dated Apr. 3, 2018), 21 pgs.

"Chinese Application Serial No. 201780068592.2, First Office Action dated Dec. 18, 2020", (English Translation), 11 pgs.

"International Application No. PCT/EP2017/073091, International Search Report dated Apr. 3, 2018", (English Translation), 3 pgs.

"Russian Patent Application No. 2019110879.2, Office Action dated Nov. 9, 2020", (w/ English Translation), 15 pgs.

"Chinese Application No. 201780068592.2, Notification of Second Office Action dated Jun. 28, 2021", (dated Jun. 28, 2021), 15 pgs.

* cited by examiner

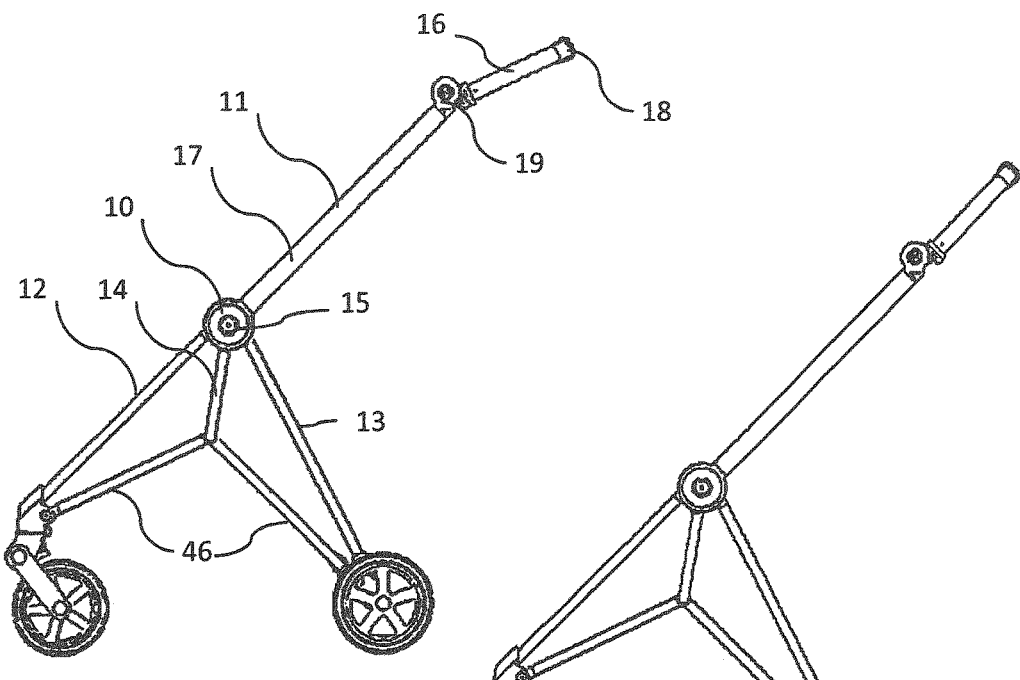
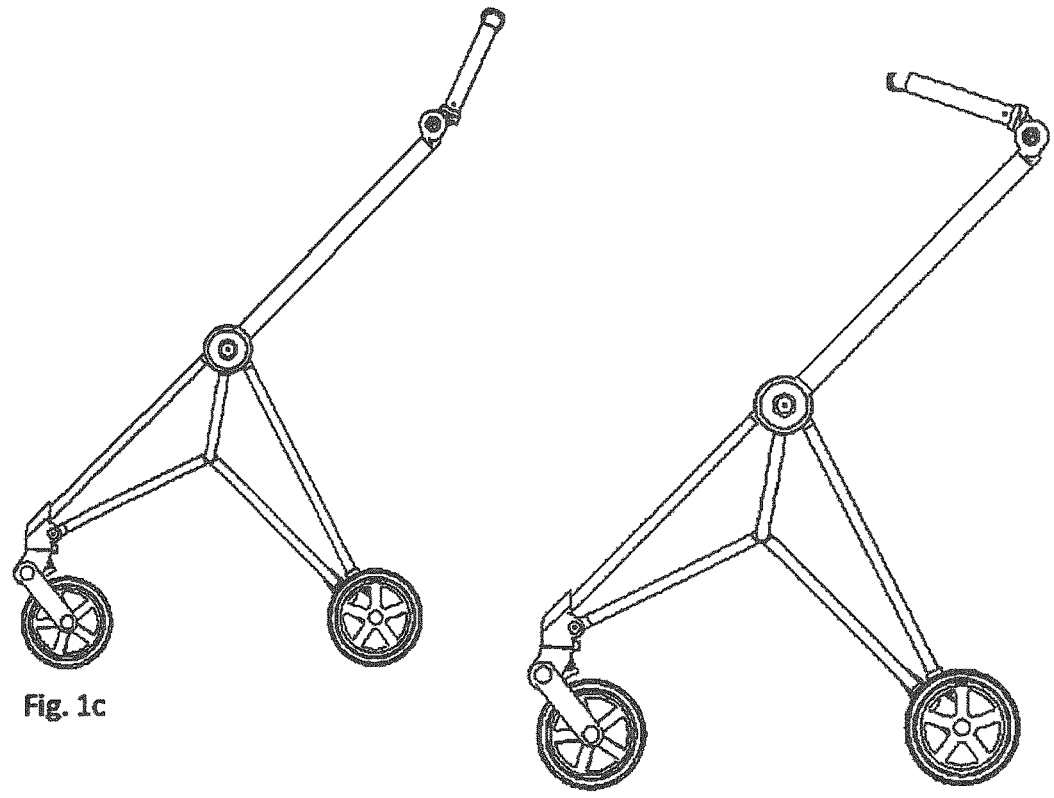

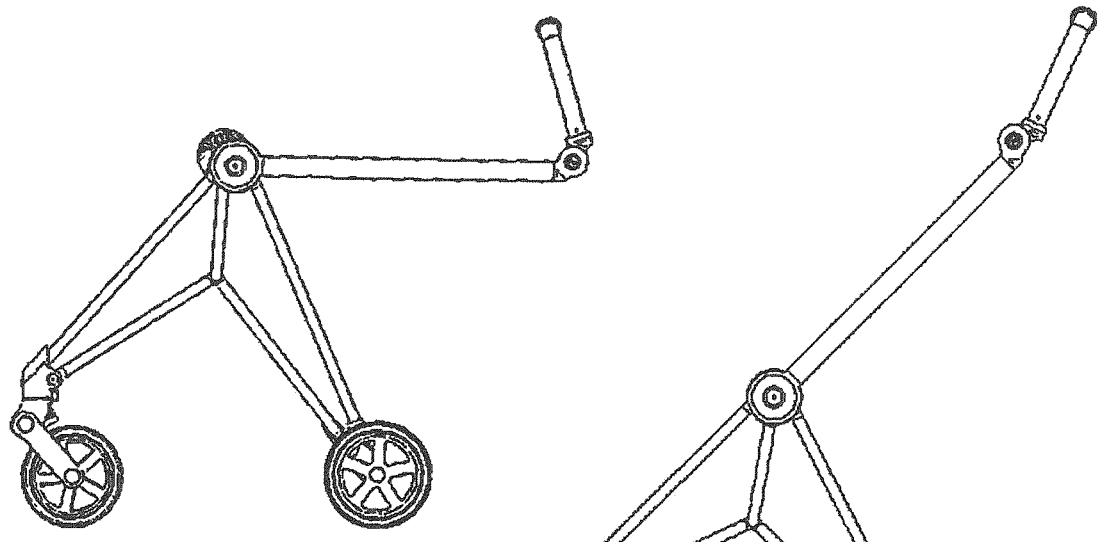
Fig. 1i
Fig. 1j
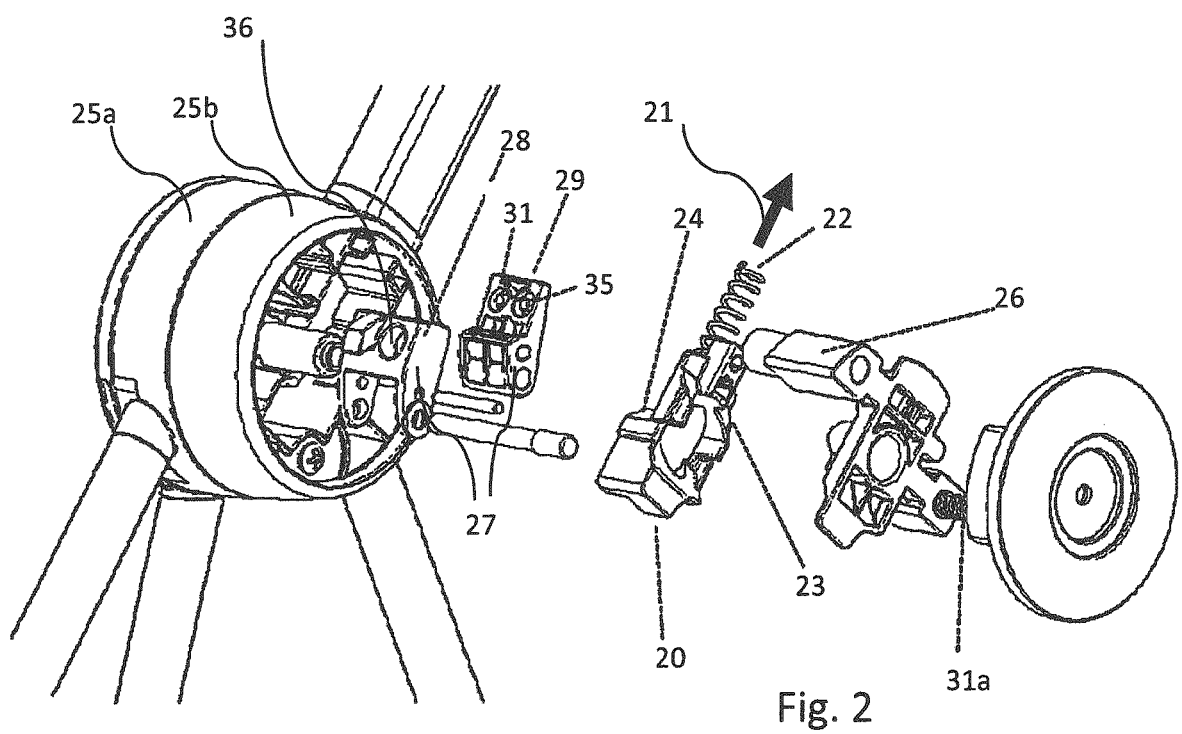
Fig. 2

PUSHCHAIR CHASSIS AND PUSHCHAIR

PRIORITY CLAIM TO RELATED APPLICATIONS

This application is a U.S. national stage filing under 35 U.S.C. § 371 of International Application No. PCT/EP2017/073091, filed on 14 Sep. 2017, and published as WO2018/050728 on 22 Mar. 2018, which claims priority to German Application No. 20 2016 105 140.1, filed on 15 Sep. 2016, and to German Application No. 20 2017 100 792.8, filed on 14 Feb. 2017, the benefit of priority of each of which is claimed herein, and which applications and publication are hereby incorporated herein by reference in their entirety.

The invention relates to a pushchair chassis and a pushchair.

A foldable pushchair chassis is known, for example, from DE 10 2014 110 215 A1. Pushchair chassis of the type discussed here, in particular sport-model pushchair chassis, buggies or similar vehicles for children are used for the practical transport of babies and infants. Frequently problematical with known pushchair chassis is the space requirements in the non-usage state. In particular, during transport it is advantageous if the pushchair can be folded together, wherein the conversion of the pushchair chassis should take place as simply as possible for a user.

Various folding mechanisms which transfer the chassis of the pushchair from a usage state into a storage state are proposed in the prior art. At least in the usage state (the usage position), the pushchair must be secured against an accidental triggering of the folding mechanism. Optionally a safety device can also be provided for the storage position (the storage state).

Foldable pushchairs usually have an articulation in which, for example, a push element and front legs and/or rear legs can rotate with respect to one another or can be fixed in relation to their position. If a safety device is provided for the storage state, this is frequently implemented by an independent mechanism.

However, the known folding mechanisms are seen to be overall disadvantageous. In particular, several separate operations of the user are required in order to transfer the pushchair from its usage state into the storage state (or conversely), for example, as a first operation a lateral unlocking of the usage position and as a second operation a folding together of the chassis, optionally with an automatic engagement in the storage state—or as a first operation, optionally a lateral unlocking of the storage state and as a second operation an unfolding of the chassis with an optionally automatic engagement in the usage position.

Insofar as no safety device is provided in the storage state, the chassis can unintentionally unfold (for example, when loading into the boot of a car). Furthermore, the folding mechanism usually cannot be operated with one hand, for example, firstly a lateral unlocking of the usage state (on both sides simultaneously) must be accomplished and then a folding process—or firstly an unlocking of the storage state with one hand and simultaneous unfolding of the chassis with the other hand.

It is therefore the object of the invention to provide a pushchair or a corresponding pushchair chassis, wherein the chassis should be foldable in a simple manner and it should be possible to secure both the usage position and also the storage position in a simple manner.

In order to solve the aforesaid object, a pushchair chassis having the features of claim 1 is proposed.

In particular, the object is solved by a foldable pushchair chassis, in particular a sport-model pushchair chassis, buggy chassis or similar vehicle chassis for children, comprising wheels as well as a push element for pushing the pushchair chassis, and optionally fastening means for fastening a pushchair attachment, wherein the pushchair chassis can be brought into a lockable usage state and into a folded lockable storage state, wherein a (manual) actuation device is provided and is configured in such a manner that during transfer from the locked usage state into the locked storage state, at least two processes (in particular folding and/or locking processes) can be carried out, preferably both a release of the locking in the usage state and also an adjustment of a locking in the storage state by means of a (single) first actuation of the actuation device.

A (manual) actuation device should be understood in particular as an actuation device which can be reached by the user (without dismantling the pushchair) and can be actuated by the user (manually). A manual actuation should be understood in particular as an actuation by hand and/or by foot. The actuating device is formed in particular by a (one-piece) actuating element such as, for example, a clip or a lever. A single actuation of the actuation device should be understood in particular as a process in which the user operates (in particular moves) the actuation device once. A storage state is to be understood in particular as a state in which a front and a rear leg or front and rear pair of legs are moved (rotated) towards one another and/or the push element is moved (rotated) in the direction of a front leg (pair of legs) (starting from the usage state).

A core aspect of the invention lies in that the pushchair chassis can be brought in a (single) operation in each case from a locked (locked) usage position into a locked (locked) storage position and optionally back. In one folding joint (for folding the pushchair chassis), in this one operation optionally several processes can be initiated simultaneously, overlapping in time or successively in time. Specifically for example, the pre-tensioning of a locking device for a locking of the storage position (the storage state) and the release of a locking (locking) of the usage position (the usage state) can take place. The actuation is in particular a (purely) translational and/or (purely) rotational movement or a combination thereof. During an actuation the direction of rotation is reversed during a rotation and/or during a translation the direction is preferably not reversed. Preferably the first actuation is an actuation without movement reversal.

Overall it is achieved by the foldable pushchair chassis according to the invention that the transfer from the usage state into the storage state can be accomplished in a simple manner and nevertheless a safe usage of the pushchair chassis is made possible. In particular, a folding process can be performed with a (single) operation (optionally one-handed), wherein such an operation should preferably be understood as a continuous movement sequence (without setting down or grasping).

During a transfer from the locked storage state into the locked usage state, preferably (at least or precisely) one or at least two locking processes, for example, a release of the locking in the storage state and/or an adjustment of the locking in the usage state are carried out by a (single) second actuation of the actuation device. The second actuation is preferably an actuation without movement reversal. Furthermore the second actuation can be a kinematic reversal of the first actuation. A kinematic reversal should be understood in particular (in the case of rotational actuation) as a turning back or (in the case of translational actuation) a movement back. Advantageously the unfolding from the storage state into the usage state can be carried out in one operation (preferably one-handed).

The adjustment of a locking should be understood in particular as a process in which the respective state is locked when it is adopted. The adjustment of the locking can therefore in particular take place before the adoption of the respective state, for example, by pre-tensioning a pre-tensioning device (in particular spring). The exclusive bringing into the respective state should preferably not be understood as actuation. A (first or second) actuation should therefore in particular be understood as a process in which the release of a locking or the cancelling of a locking is actively controlled (by the user).

The actuation device can be configured so that the first actuation has the result that the release of the locking in the usage state and the adjustment of the locking in the storage state overlaps temporally at least in sections, in particular takes place simultaneously or takes place successively in time (possibly at time intervals). Alternatively or additionally the actuation device can be configured so that the second actuation has the result that the release of the locking in the storage state and (if implemented), the adjustment of the locking in the usage state overlaps temporally at least in sections, in particular takes place simultaneously or takes place successively in time (possibly at time intervals).

In a specific embodiment the actuation device can be pivoted to carry out the first and/or the second actuation. In this case, the second actuation is preferably a pivoting back of the pivoting in the form of the first actuation. An actuation by pivoting is comparatively less prone to faults (e.g. compared to telescopic solutions), in particular is comparatively tolerant with respect to dirt ingress. Comparatively large tolerances in manufacture are also acceptable without appreciably restricting the functionality. Overall a reliable and extremely simple operation of the foldable pushchair chassis is thereby achieved.

The actuation device can be part of a push element and/or a clip, in particular a sliding clip (or comprise such) and/or can be a lever (or comprise such) and/or a flap (or comprise such). Alternatively or additionally at least one push element section of a/the push element can be pivotable for height adjustment of a handle, in particular can be locked in different pivot positions. Overall the operation of the folding mechanism is further simplified.

The actuation device can cooperate with an adjusting device, preferably via a pull element, in particular a Bowden cable, wherein the adjusting device can be adjusted into at least one first and one second position, wherein the usage state is locked in the first position and/or a locking of the storage state is released in the first position and/or wherein the storage state is locked in the second position and/or a locking of the usage state is released in the second position. The adjusting device preferably moves translationally, optionally purely translationally during a transfer from the first into the second position. Particularly preferably in this case the actuating device can be actuated by (optionally exclusively) rotational pivoting. As a result, a reliably functioning folding of the pushchair chassis is made possible in a simple manner.

The adjusting device can comprise a first action transmission device, in particular a first run-in slope in such a manner that during transfer from the first position into the second position in the usage state, a first lock element is moved, in particular against the action of a tensioning device, preferably a spring from a lock receptacle. Alternatively or additionally, the adjusting device can comprise a second action transmission device, in particular a second run-in slope in such a manner that during a transfer from the first position into the second position in the storage state, a second lock element is moved in particular against the action of a tensioning device, preferably spring, into a lock receptacle. First and/or second lock element can be movable rotationally and/or translationally. In one specific embodiment, the first lock element can be moved (purely) translationally and the second lock element can be moved (purely) rotationally. Overall the locking processes are thereby further simplified.

Preferably one lock element from the first and second lock element, in particular the first lock element, is moved axially and the other, in particular the second lock element, is moved radially. As a result, a space-saving and effective structure is provided for various locking processes.

The second lock element can comprise at least two lock element parts which can be moved towards one another, wherein a tensioning device, in particular a spring, is provided between the lock element parts in such a manner that the tensioning device pushes the lock element parts out from one another.

The storage state can be lockable in such a manner that the pushchair chassis can be folded together even further (i.e. optionally only one safety device against folding open again is provided). Preferably to this end the second lock element and the appurtenant lock receptacle are configured in such a manner (in particular asymmetrically) that the storage state is locked against unfolding, but at the same time a further folding together is possible.

The above object is further solved by a foldable pushchair chassis in particular of the type described above, preferably a sport-model pushchair chassis, buggy chassis or similar vehicle chassis for children, comprising wheels as well as a push element for pushing the pushchair chassis, and optionally with fastening means for fastening a pushchair attachment, wherein the pushchair chassis can be brought into at least one lockable usage state and into a folded, optionally lockable storage state, wherein at least one push element section of the push element is pivotable for height adjustment of a handle, wherein a locking and/or a release of the locking of the usage state and/or the storage state is accomplished by pivoting the pivotable push element section. A core idea can therefore be seen in that in an otherwise pivotable (for height adjustment) push element section, this pivotability is utilized or further configured so that a locking process can also take place. Although usual push element sections which are pivotable for height adjustment are positioned comparatively far from articulations for folding the pushchair, it was identified according to the invention that overall the operation and construction can also be simplified. The comparatively great distance between pivotable push element section and a folding joint can then be bridged, preferably by a push and/or pull device, for example, a Bowden cable. The present approach is therefore to a certain extent a departure from previous solutions in which actuating devices for locking are usually provided immediately or in spatial proximity to the folding joint. An actuation by pivoting is overall less prone to faults (e.g. compared to telescopic solutions), in particular is comparatively tolerant with respect to dirt ingress. Comparatively large tolerances in manufacture are also acceptable without appreciably restricting the functionality. Overall a simple and secure locking, in particular of the usage state is made possible by the solution according to the invention.

Preferably a/the pivotable push element section can be locked in at least two, preferably at least three pivot positions. Alternatively or additionally, a/the pivotable push element section can be pivotable with respect to a further push element section. A pivot axis of the pivotable push element section preferably has a distance of at least 10 cm, preferably at least 20 cm with respect to a folding joint. The push element section can overall be a (U-shaped) clip, wherein legs of the clip are at least 10 cm or at least 15 cm and/or at most 30 cm or at most 25 cm or at most 20 cm long.

According to further (independent) aspect of the invention which however is preferably combined with the above aspects, a foldable pushchair chassis is proposed, in particular a sport-model pushchair chassis, buggy chassis or similar vehicle chassis for children, comprising wheels as well as a push element for pushing the pushchair chassis, wherein the pushchair chassis can be brought at least into a lockable usage state and into a folded, optionally lockable storage state, wherein the pushchair chassis is configured so that a release of the locking of the usage state can be accomplished either (only) by two different actuation steps (process step) which are performed simultaneously or (only) by three successive actuation steps (process steps), wherein the pushchair chassis has at least one adjustment possibility by means of which at least two different usage positions can be adjusted, wherein at least one further (at least third) position, namely an unlocking position can be adopted in which the locking of the usage state is or will be released.

The adjustment possibility in particular comprises an adjustment of a frame (or framework) of the pushchair chassis (in particular with regard to a relative angle between adjacent sections or with regard to a distance from adjoining sections), i.e. for example, a height adjustment, in particular a height adjustment of the push element. The transfer from one position (in particular a last usage position) into another position (in particular an unlocking position) can preferably take place (only) by two simultaneous actuation steps (e.g. pressing a button and pivoting a section, e.g. of a lever or a frame part, in particular a push element section). Alternatively this can also (only) be made possible by three (successive) process steps). In one embodiment, the same actuation steps (in particular simultaneous) for the transfer between the at least two usage positions and the transfer from a (last) usage position into the unlocking position can be carried out by the same (or corresponding) actuation steps (process steps), for example, by simultaneous pressing (of the same) button or generally the same safety device and movement (in particular pivoting) of a section of the pushchair chassis, in particular of a push element section. Preferably the unlocking position does not lie between the at least two (different) usage positions.

According to an alternative idea, an additional position is added to the adjustment possibility (in particular the height adjustment, wherein this additional position preferably does not lie between two already existing positions for the adjustment (height adjustment). The additional position is configured in such a manner that when this position is adopted, the frame locking is released and the pushchair can be folded up.

Particularly preferably, two simultaneous process steps are necessary for the adjustment of the adjustment possibility (of the height adjustment), in particular of the pivoting of the pivotable section, for example, the actuation of the safety device (in particular pressing the button) and the simultaneous displacement (pivoting) of the push element. Preferably a mechanism is provided between the last usage position and the additional position, particularly preferably directly before reaching the additional position, which mechanism prevents an (accidental) transfer into the additional position, for example a stop (or a locking). As a result, the user is forced to simultaneously execute both steps actually before the transfer into the additional position (and not possibly only for leaving the last usage position). Preferably the additional position is designed in such a manner that it is unsuitable for normal use, for example, at a height and/or position of the push element unsuitable for pushing, in order to make an accidental transfer less probable.

The pushchair chassis is preferably configured so that a pivoting of a/the pivotable push element section into a pivot position in which a locking and/or a release of the locking of the usage state and/or the storage state is accomplished can only be made after previous or only after simultaneous actuation of a safety device, in particular a knob, preferably on a horizontal section of the push element. The knob is preferably arranged in the centre of the horizontal push element section. This knob can additionally also allow a height adjustment of the push element in the sense that a height adjustment can only be made by depressing the button (in general: actuating the safety device) and simultaneous pivoting of the pivotable push element section.

In particular, in a pivot position of the pivotable push element section in which this no longer adopts any (meaningful) useful position (but in particular a position in front of the locking position), for example, a stop and/or latching device can prevent the push element section being able to be brought into a pivot position in which a locking and/or a release of the locking of the usage state and/or of the storage state can take place. Only by actuating the safety device (in particular pressing the button) is then preferably a locking and/or a release of the locking of the usage state and/or of the storage state made possible (since the pivot position necessary for this can then be achieved). Preferably the actuation of the safety device (in particular pressing the button) is necessary in a pivot position in which the pivotable push element section is located in an angular range which lies between a vertical alignment and an alignment antiparallel to the push element section adjoining the pivotable push element section (in which the pivotable push element section therefore in particular comes to abut against the push element section adjoining the pivotable push element section), preferably the actuation of the safety device is necessary in an angular range which lies between a position of the pivotable push element section in which the pivotable push element section is rotated starting from the vertical extension further in the direction of the push element section adjoining the pivotable push element section, for example, by an angle of at least 10° or at least 20° and a position of the pivotable push element section in which this extends (at least substantially) antiparallel to the push element section adjoining the pivotable push element section or preferably extends at an angle of at least 10° to this adjoining push element section.

As a result of the need to actuate the safety device (or the corresponding configuration of the pushchair chassis), a frame locking is provided which in particular is made possible in particular by only two simultaneous process steps (pivoting of the pivotable push element section and actuation of the safety device, in particular pressing the button).

Preferably the pushchair is configured so that the transfer into the unlocking position (additional position) and the folding of the frame requires a force or a torque whose magnitudes are different and/or whose directions are different. In particular, the pushchair is configured so that a torque for pivoting the pivotable section of the locking and/or for releasing the locking of the usage state and/or of the storage state points in a direction which differs from the direction of a torque required for folding the frame. Preferably the additional position (unlocking position) is further at least 1.5 times or at least twice or three times or at least five times as far) from the last position as the usage positions (on average) from one another.

In general, the pushchair chassis can have a front leg, in particular a pair of legs and at least one rear leg, in particular a pair of rear legs. In each case, a front and a rear leg are preferably connected to a folding joint in an articulated manner, to which the push element can optionally also be connected in an articulated manner. In addition, optionally a connecting part (connecting linkage) can connect front leg and rear leg, optionally front pair of legs and rear pair of legs to one another. This connecting part can optionally also be connected to the folding joint in an articulated manner.

The actuating device can be configured so that the release of the locking in the usage state, the transfer into the storage state and the locking of the storage state can be carried out with one hand, in particular by gripping and corresponding application of force, in particular pressing, on a handle, in particular push element handle. Alternatively or additionally the actuating device can be configured so that the release of the locking in the storage state, the transfer into the usage state and the locking of the usage state can be carried out with one hand, in particular by gripping and corresponding application of force, in particular pulling, on a handle, in particular push element handle.

The aforesaid object is further solved by a pushchair, in particular sport-model pushchair, buggy or similar vehicle for children, comprising a pushchair chassis of the type described above. In the pushchair an integrated receptacle can be provided for the child or an (optionally separable) pushchair attachment, in particular child seat, high chair frame, child car seat (or the like).

Furthermore the aforesaid object is solved independently by a method for folding and/or unfolding a pushchair chassis of the type described previously wherein accordingly functionally formulated features can be replaced by corresponding process steps. Further embodiments are obtained from the subclaims.

The invention is described hereinafter with reference to an exemplary embodiment which is explained in detail with reference to the figures. In the figures:

FIG. 1a shows a pushchair chassis according to the invention in a side view;

FIG. 1b shows a side view according to FIG. 1a in a different state of the pushchair chassis;

FIG. 1c shows a side view according to the previous figure in a further state of the pushchair chassis;

FIG. 1d shows a side view according to the previous figure in a further state of the pushchair chassis;

FIG. 1i shows a side view according to the previous figure in a further state of the pushchair chassis;

FIG. 1j shows a side view according to the previous figure in a further state of the pushchair chassis;

FIG. 2 shows an exploded view of a folding joint;

FIG. 3a shows a first sectional view of the folding joint in a first state;

FIG. 3b shows a section of the folding joint in a state according to FIG. 3a;

FIG. 4a shows a sectional view of the folding joint similar to FIG. 3a in a different state of the folding joint;

FIG. 4b shows a further state of the folding joint in the state according to FIG. 4a;

In the following description, the same reference numbers are used for the same parts and parts having the same effect.

Figure 1E:
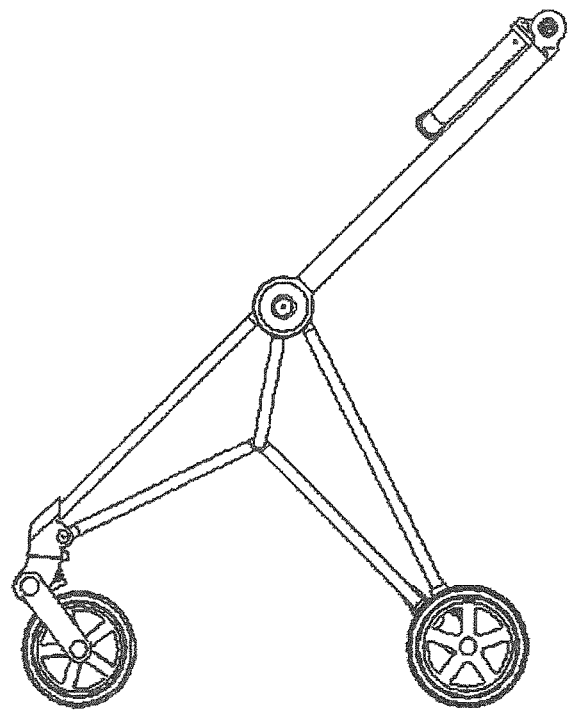
FIG. 1e shows a side view according to the previous figure in a further state of the pushchair chassis.

FIG. 1a shows a foldable pushchair chassis with a (central) folding joint 10 by means of which a push element 11 and a front leg 12 of a front pair of legs, a rear leg 13 of a rear pair of legs and a connecting part 14 are connected to one another in an articulated manner. A second, corresponding configured and arranged folding joint can be arranged in the drawing according to FIG. 1a behind the depicted folding joint 10. The elements 12, 13, 14 and/or 46 can accordingly be designed to be double. Push element 11, front leg 12 and rear leg 13 are rotatable about an axis 15. The connecting part 14 rotates eccentrically with respect to this axis 15 (as will be explained in further detail further below). The push element 11 comprises a distal push element section 16 and a proximal push element section 17. The distal push element section 16 comprises a handle 18 and is connected in an articulated manner via a push element joint 19 to the proximal push element section 17. The height of the handle 18 can be adjusted by pivoting the distal push element section 16 with respect to the proximal push element section 17 (for example, in three different positions, in particular a downward-folded, a middle and an upward-folded position). In the different positions the distal push element section 16 can then optionally be locked with respect to the proximal push element section 17. For release of the locking a (central) release mechanism (button) can be provided on the handle 18 (transverse rod) of the distal push element section 16. This release mechanism (button) can, for example, release a locking in the push element joint 19 via a pull element (in particular Bowden cable).

FIG. 1b shows the state (usage state) according to FIG. 1a, wherein unlike FIG. 1a, the distal push element section 16 is pivoted into a different (middle) position so that the handle 18 is positioned higher. FIG. 1c again shows a position in which the distal push element section 16 is pivoted still further so that the handle 18 is positioned even higher (at maximum height).

In the usage state according to FIGS. 1a to 1c the pushchair can be used for conveying a child (in a pushchair attachment).

As illustrated in FIGS. 1d and 1e, the distal push element section 16 can be rotated beyond the position according to FIG. 1c (FIG. 1d) until it impacts against the proximal push element section 17 towards the front (FIG. 1e). As a result, an adjusting element in the folding joint 10 can be displaced (in particular against the force of a spring, as described in detail further below) from a first into a second position. It is crucial here however that a locking of the folding joint 10 according to FIG. 1e is released in such a manner that the pushchair chassis can be brought into the state according to FIG. 1f (folded storage state). The locking of the usage state is therefore released by pivoting the distal push element section 16. The pushchair chassis can be configured so that for pivoting from the position according to FIG. 1d into the position according to FIG. 1e at least in an intermediate position between these two positions, in particular directly before reaching the position according to FIG. 1e, during the pivoting, a safety device must be actuated, in particular (preferably the above-mentioned) release mechanism (button) must be actuated.

As a result, it is at least significantly less probable that the position according to FIG. 1e can be reached unintentionally. An actuation of the safety device, preferably the button is in particular to be understood as an actuation in which the safety device (the button) is actively subjected to pressure (for example, against a spring force).

Figure 1F:
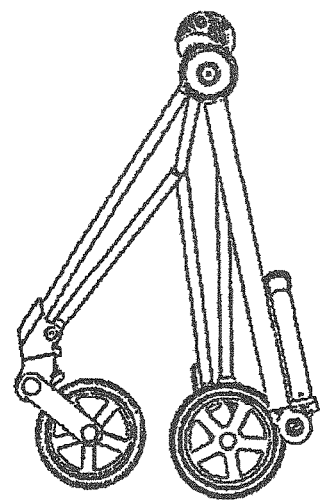
FIG. 1f shows a side view according to the previous figure in a further state of the pushchair chassis.
Figure 1G:
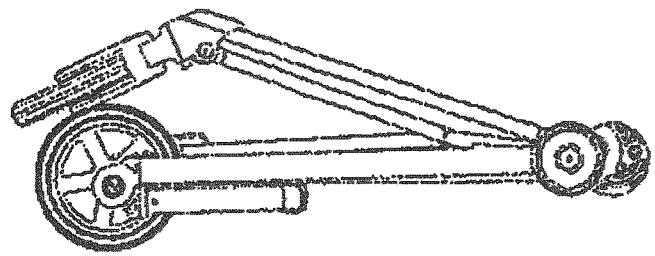
FIG. 1g shows a side view according to the previous figure in a further state of the pushchair chassis.

FIG. 1g shows a state in which the pushchair chassis is folded further compared with FIG. 1f. In the state according to FIG. 1f, the pushchair chassis is locked with respect to unfolding again but not (only to a lesser extent) against a further folding, as shown in FIG. 1g. The state according to FIG. 1g is also not locked so that in this state, by means of a suitable unfolding the state according to FIG. 1f can be reached again (without the distal section 16 being moved).

The further unfolding again of the pushchair chassis in the usage position is fundamentally accomplished similarly to the folding as described with reference to FIG. 1a to 1f or 1g. Initially the distal push element section 16 is pivoted back (see FIG. 1h) so that the locking in the folding joint 10 is released again. As a result, the pushchair chassis can be unfolded again as shown in FIGS. 1i and 1j. FIG. 1j shows the usage state according to FIG. 1c.

The mechanism for locking usage state or storage state is explained further hereinafter with reference to FIGS. 2-8.

FIG. 2 shows a (partial) exploded view of the folding joint 10 in the state according to FIG. 1a or 1j. Specifically FIG. 2 shows an adjusting device 20 (adjusting element) which can be pulled radially (here and hereinafter, unless specified otherwise, radially and axially always relate to the axis 15 according to FIG. 1a) by the upper push element section 16 or a pull element connected to this (in particular Bowden cable; not shown in the figures) in the direction of an arrow 21 against the action of a first spring 22. As a result, a first sloping surface (ramp) 23 and a second sloping surface (ramp) 24 is moved in the direction of the arrow 21.

During a movement of the adjusting device 20 with respect to joint sections 25a, 25b as a result of the sloping surfaces 23, 24, a first lock element 26 is displaced in the axial direction and a second lock element 27, comprising a first (outer) lock element part 28 and a second (inner) lock element part 29 is displaced in the radial direction. This displacement or movement of the lock elements 26, 27 is accomplished against the force of springs (not shown in FIG. 2, localized with the reference numbers 31a, 31b and 35), as will be described hereinafter with reference to FIGS. 3a to 8.

Figures 3A, 3B:
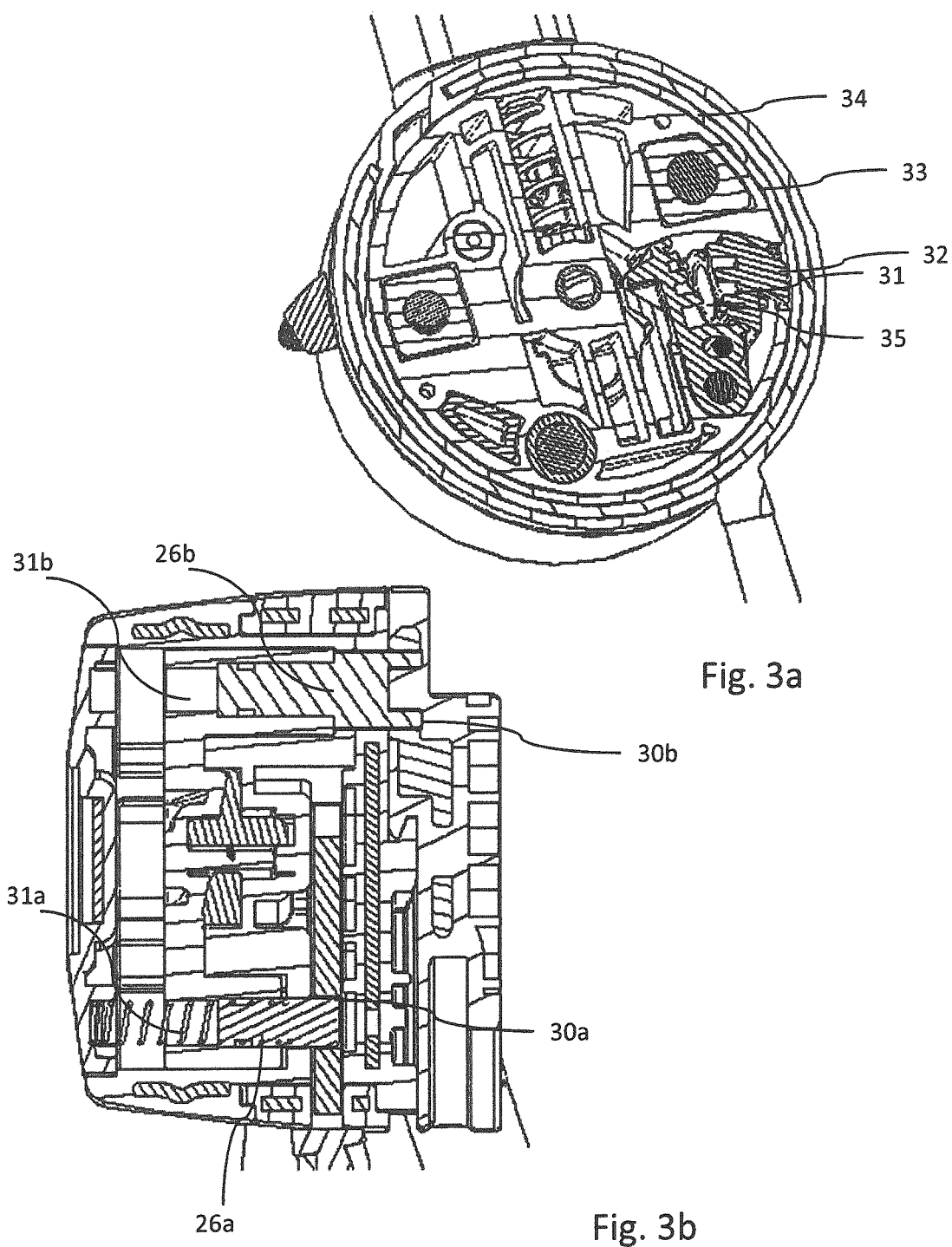

FIGS. 3a and 3b correspond to a state of the pushchair chassis according to FIG. 1a, 1b, 1c or 1d. Lock sections 26a, 26b of the first lock element 26 can be seen in FIG. 3b which are positioned in corresponding lock receptacles 30a, 30b. As a result, the folding joint 10 is fixed in such a manner that a folding is impossible. In the state according to FIGS. 3a and 3b the first lock element 26 therefore prevents aby folding via the folding joint. The second lock element can be seen in cross-section in FIG. 3a. In the state according to FIG. 3a the second lock element 27 neither secures the usage state against folding (this function is taken over by the first lock element 26) nor is the lock element 27 in a state in which it could secure the storage state (as will be explained in further detail further below).

Figures 4A, 4B:
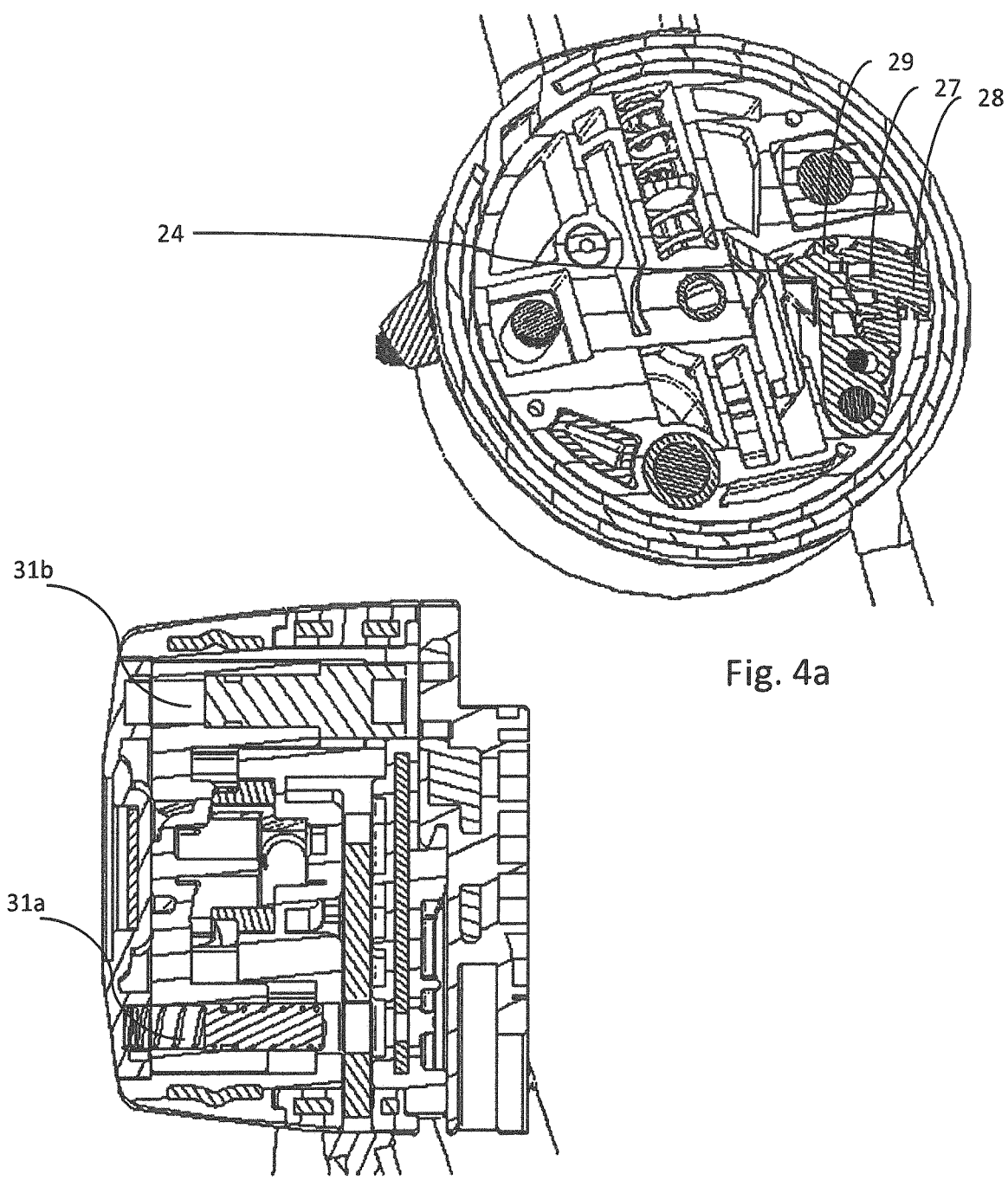

FIGS. 4a and 4b correspond to the state according to FIG. 1e. In this state the pushchair is still unfolded but the upper push element section 16 is already pivoted into its maximum pivoted end position. This is equivalent to the fact that the adjusting device 20 according to FIG. 2 has been moved in the direction of the arrow 21 in the radial direction, which has the consequences shown in FIGS. 4a and 4b. As a result of the first run-in slope 23 shown in FIG. 2, the lock sections 26a and 26b are urged from the assigned lock receptacles 30a and 30b and specifically against the spring force of second springs (partially not shown in detail: localized at 31a and 31b, see FIG. 3b). Thus, the first lock element 26 no longer secures the child seat against folding. The second lock element 27 according to FIG. 4a also does not (yet) secure the child seat against a folding process. However, the second lock element 27 is now in a state in which it can secure (lock) the storage state according to FIG. 1f as soon as this is adopted (as shown in FIG. 1f). This is (inter alia) the consequence of a movement of the second lock element part 29 in the direction of the first lock element part 28. The position of the first lock element part 28 corresponds to that according to FIG. 3a. However, the second lock element part 29 has not changed. Specifically as a result of this position change, the third spring (cannot be seen in detail, localized at 31, see FIGS. 2 and 3a) is compressed so that a spring force acts on a lock projection 32 and the lock projection 32 is fundamentally urged in the radial direction. The lock projection 32 here however impacts against the inner surface 33 of a surrounding part 34 so that it stays in the position similar to FIG. 3a despite spring force. The fourth spring (cannot be seen in detail in the figures; localized at 35, see FIG. 3a) is compressed by the transition or the actuation of the distal push element section 16 (i.e. the transition from FIGS. 3a, 3b to 4a, 4b). This spring 35 is supported on the one hand on the second lock element part 29 and on the other hand on the inner surface 33 of the surrounding part 34. To this end an opening 36 (see FIG. 2) is provided in the first lock element part. The fourth spring 35 therefore fundamentally urges the first spring part element inwards in the radial direction. As a result of the action of the second sloping surface 24, however, this inwards urging is blocked in the state according to FIGS. 4a, 4b.

In FIGS. 4a and 4b neither the first lock element nor the second lock element secure, so that the pushchair chassis can be folded.

Figure 5:
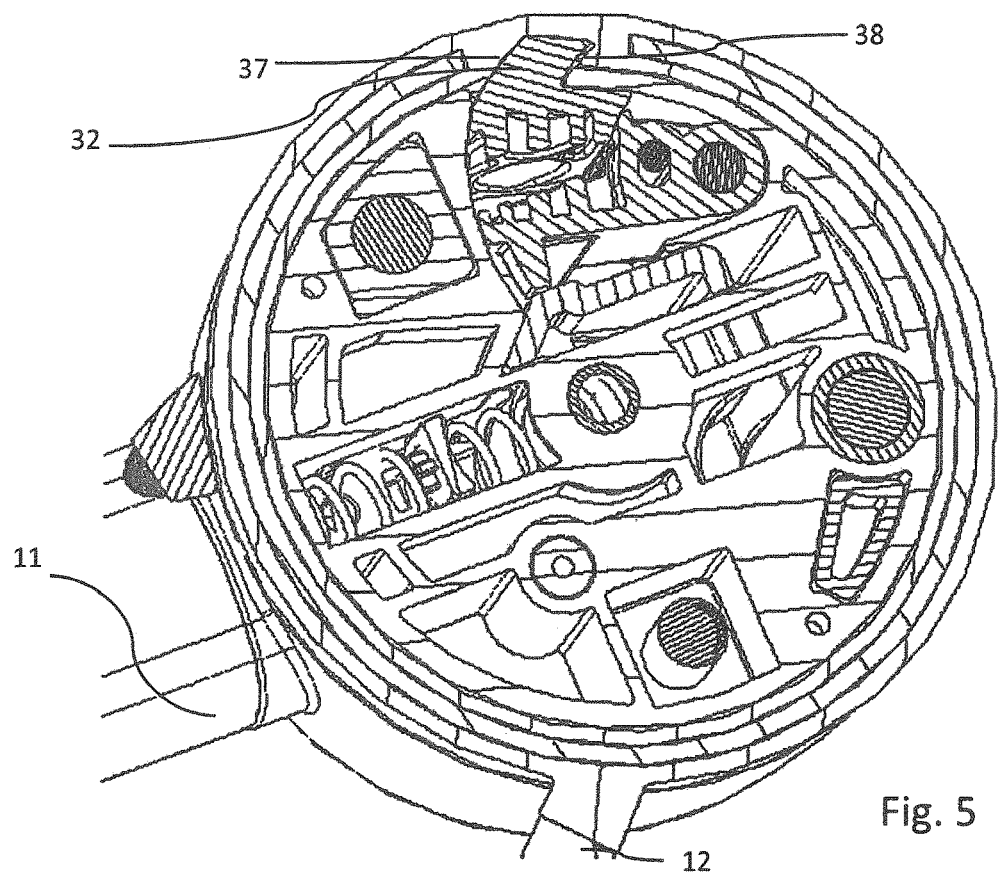
FIG. 5 shows a section of the folding joint similar to FIGS. 3a and 4a in a further state of the folding joint.
Figure 6:
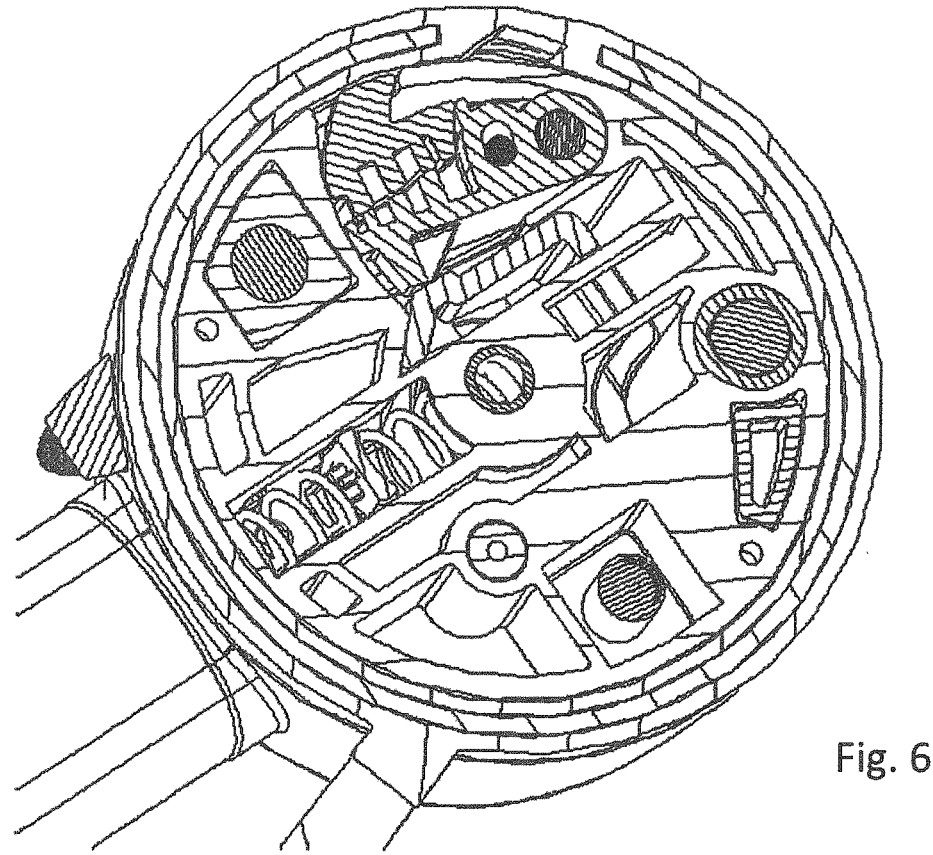
FIG. 6 shows a section through the folding joint similar to FIGS. 3a, 4a and 5 in a further state of the folding joint.
Figure 7:
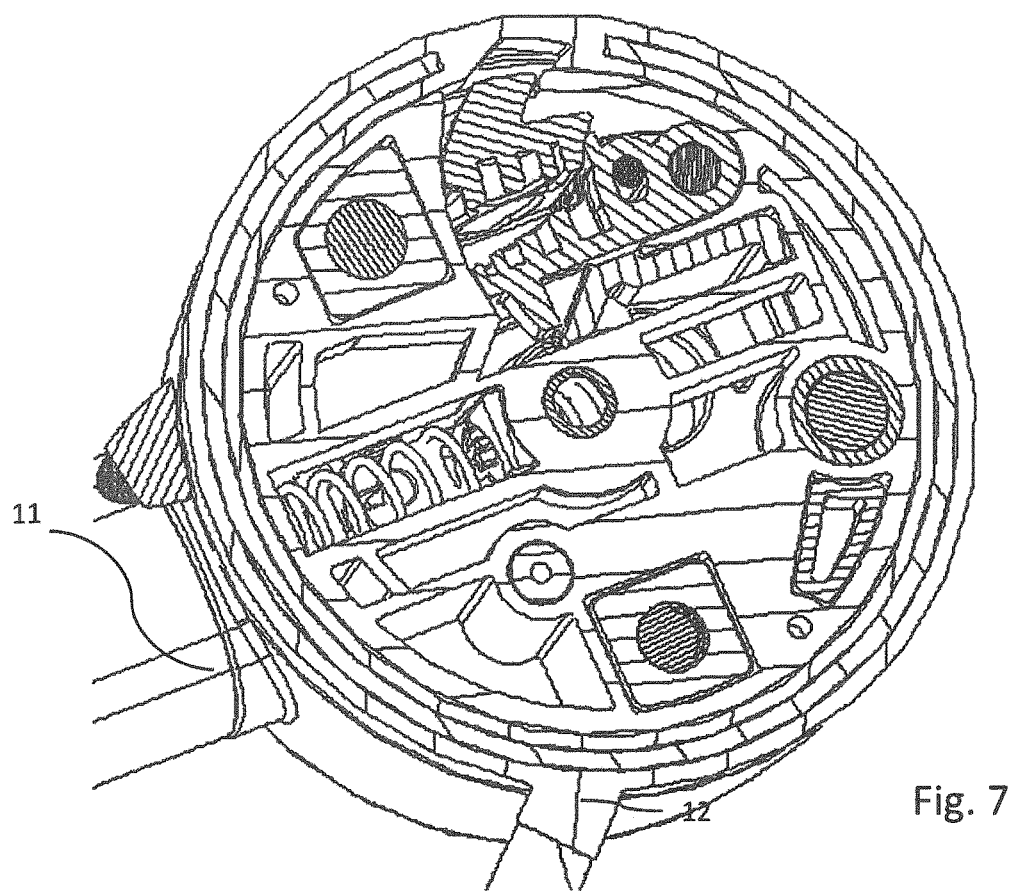
FIG. 7 shows a section similar inter alia to FIG. 3a in a further state of the folding joint.
Figure 8:
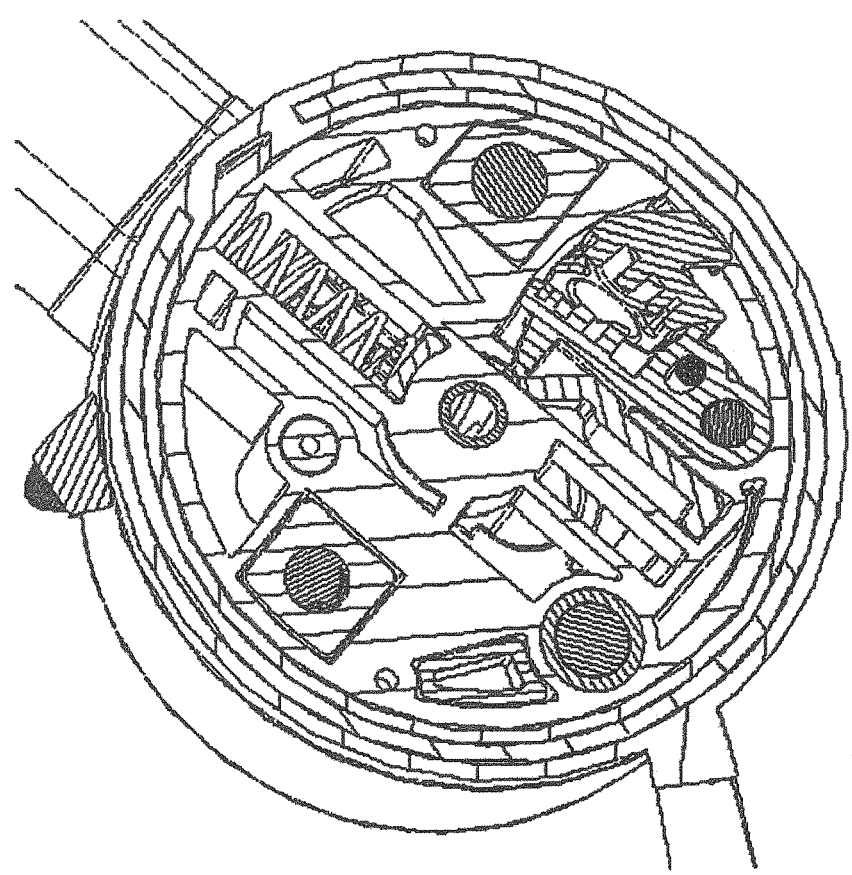
FIG. 8 shows a section similar inter alia to FIG. 3a in a further state of the folding joint.

FIG. 5 shows the folding joint 10 in a state similar to FIG. 1f, i.e. in a folded storage state. The push element 11 is here rotated with respect to the front leg 12. As a result of this rotation the pre-tensioned lock projection 32 enters into a corresponding lock receptacle 37 so that this storage state is locked. Lock projection 32 and lock receptacle 37 are however configured (asymmetrically) in such a manner that during a further folding (into the position according to FIG. 1g), no (or only a slight) securing exists, in particular the locking can be overcome merely further folding (without releasing any mechanism). This is shown in FIG. 6 (similarly to FIG. 1g). In particular an undercut 38 prevents any folding back in the direction of the usage state (without a corresponding actuation of the actuation device).

Figure 1H:
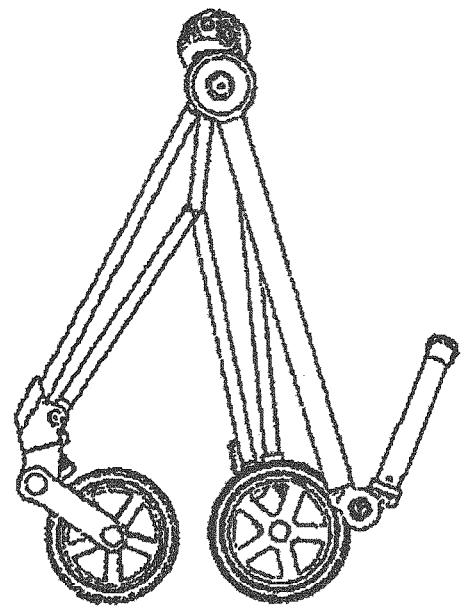
FIG. 1h shows a side view according to the previous figure in a further state of the pushchair chassis.

If the actuation device (the distal push element section 16) is now actuated again, i.e. pivoted back according to FIG. 1h, the second lock element part 29 (see FIG. 7) can move radially inwards. This movement is forced as a result of the pre-tension of the fourth spring 35. Furthermore, the first lock element part 28 is pulled in the radial direction inwards by the second lock element part 29 so that the lock projection 32 is pulled from the appurtenant lock receptacle 37 and the locking is overall cancelled so that the child seat can be unfolded. The state according to FIG. 1*i* is shown again in cross-section in FIG. 8. The state according to FIG. 1*j* corresponds to the cross-section according to FIG. 3*a*.

As can be seen (for example) in FIG. 3*a*, the first lock element part 28 is mounted pivotably about an axis 40 with respect to the second lock element part 29, wherein this pivoting is delimited by a pivoting limiter 41 (specifically in the form of an elongate hole in the second lock element part which can cooperate with a corresponding pin in the first lock element part).

In the position according to FIG. 1*f* the pushchair can stand freely on all wheels ("self-standing function"). In the further folded (flatter) second storage state according to FIG. 1*g*, this is no longer possible. From the second storage state according to FIG. 1*g* the pushchair chassis can again be brought into the first storage state according to FIG. 1*f* without overcoming an resistance (a locking).

Figure 9:
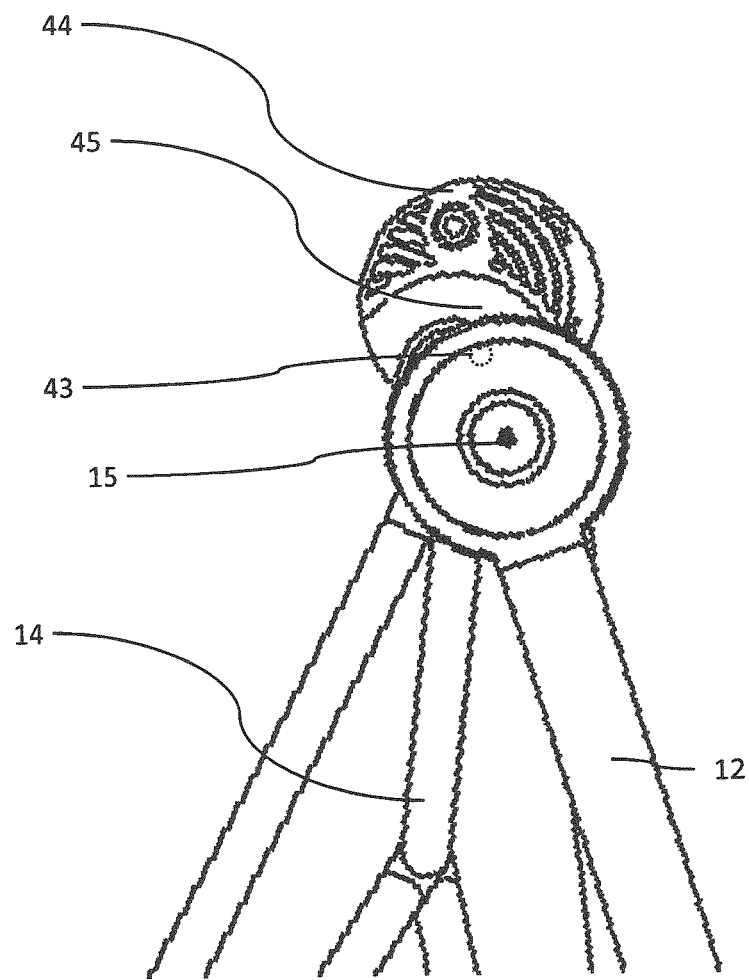
FIG. 9 shows an enlarged section from FIG. 1h.

As described in FIGS. 3 to 8, in principle the push element 11 (shown in FIGS. 3 to 8) can be locked with respect to the respective front leg 12. In this case, all the remaining pivotably mounted parts, namely the rear legs and the connecting part are fixed (secured). Furthermore it is the case that during a folding of push element 11 with respect to front pair of legs 12, the remaining parts (connecting part 14 and rear leg 13) are also automatically folded. This is achieved whereby the connecting part 14 is pivotable about a pivot axis 43 (indicated as a dashed circle in FIG. 9) eccentrically with respect to the axis 15. Furthermore, the connecting part 14 is firmly connected to a linkage part 44 comprising a linkage 45. This linkage 45 has a guiding function and can optionally also have a securing function (when a corresponding undercut is formed). It is crucial however that the connecting part 14 moves upwards as a result of the eccentric pivoting mounting which, as a result of the overall construction, as shown in FIG. 1*a*, has the result that front leg 12 and rear leg 13 approach one another and connecting struts 46 shown in FIG. 1*a* approach one another. In order to achieve this, front leg 12, rear leg 13 and respective connecting part 14 are pivotable amongst one another.

At this point, it should be pointed out that the parts, the elements, and the structures described above when viewed by themselves alone or in any combination, including the details shown in the drawings, describe various non-limiting examples. Modifications thereof are familiar to the person skilled in the art.

REFERENCE LIST

10 Folding joint
11 Push element
12 Front leg
13 Rear leg
14 Connecting part
15 Axis
16 Distal push element section
17 Proximal push element section
18 Handle
19 Push element joint
20 Adjusting device (adjusting element)
21 Arrow
22 First spring
23 First sloping surface
24 Second sloping surface
25*a* First section
25*b* Second section
26 First lock element
26*a* Lock section
26*b* Lock section
27 Second lock element
28 First (outer) lock element part
29 Second (inner) lock element part
30*a* Lock receptacle
30*b* Lock receptacle
31 Third spring
31*a* (Second) spring
31*b* (Second) spring
32 Lock projection
33 Inner surface
34 Surrounding part
35 Fourth spring
36 Opening
37 Lock receptacle
38 Undercut
40 Axis
41 Pivoting limiter
43 Pivot axis
44 Linkage part
45 Linkage
46 Connecting struts

The invention claimed is:

1. A foldable pushchair chassis, the foldable pushchair chassis comprising:
   wheels; and
   a push element for pushing the pushchair chassis,
   wherein the pushchair chassis is configured to be brought at least into a lockable usage state and into at least one folded lockable storage state,
   wherein a manual actuation device is provided and is configured in such a manner that a transfer from the locked usage state into the locked storage state includes a release of the locking in the usage state and an adjustment of a locking in the storage state by a single first actuation of the actuation device.

2. The foldable pushchair chassis according to claim 1, wherein the first actuation is an actuation without movement reversal.

3. The foldable pushchair chassis according to claim 1,
   wherein a transfer from the locked storage state into the locked usage state includes a release of the locking in the storage state corresponding to a single second actuation of the actuation device,
   wherein the second actuation includes an actuation without movement reversal, or
   wherein the second actuation includes a kinematic reversal of the first actuation.

4. The foldable pushchair chassis according to claim 1,
   wherein the actuation device is configured so that the first actuation has the result that the release of the locking in the usage state and the adjustment of the locking in the storage state overlaps temporally or occurs successively.

5. The foldable pushchair chassis according to claim 3,
   wherein the actuation device is configured to pivot to carry out the first or the second actuation.

6. The foldable pushchair chassis according to claim 1,
   wherein the actuation device is a part of the push element, a clip, a lever, or a flap, or that at least one push element section of the push element is pivotable for height adjustment of a handle.

7. The foldable pushchair chassis according to claim 1,
wherein the actuation device cooperates with an adjusting device,
wherein the adjusting device is configured to be adjusted into at least one first and one second position,
wherein the usage state is locked in the first position or a locking of the storage state is released in the first position, or
wherein the storage state is locked in the second position or a locking of the usage state is released in the second position.

8. The foldable pushchair chassis according to claim 7,
wherein the adjusting device comprises a first action transmission device having a first run-in slope configured in such a manner that during transfer from the first position into the second position in the usage state, a first lock element is moved against the action of a tensioning device from a lock receptacle, or
wherein the adjusting device comprises a second action transmission device having a second run-in slope configured in such a manner that during a transfer from the first position into the second position in the storage state, a second lock element is moved against the action of a tensioning device into a lock receptacle.

9. The foldable pushchair chassis according to claim 8,
wherein one lock element selected from the first and second lock element is moved axially and the other lock element selected from the first and second lock element is moved radially.

10. The foldable pushchair chassis according to claim 8,
wherein the second lock element comprises at least two lock parts configured to be moved towards one another,
wherein a tensioning device is provided between the at least two lock parts in such a manner that the tensioning device pushes the lock parts out from one another.

11. The foldable pushchair chassis according to claim 8,
further comprising an appurtenant lock receptacle and
wherein the storage state is lockable in such a manner that the pushchair chassis is configured to fold together into a further state,
wherein the second lock element and the appurtenant lock receptacle are configured in such a manner that the storage state is locked against unfolding and retained in the further state.

12. The foldable pushchair chassis according to claim 1,
wherein at least one section of the push element is pivotable for height adjustment of a handle,
wherein a locking or a releasing of the locking of the usage state or the storage state includes pivoting the section.

13. The foldable pushchair chassis according to claim 12,
wherein the at least one section is configured to lock in at least two pivot positions or wherein a first section of the at least one section is pivotable with respect to a second section of the at least one section.

* * * * *